United States Patent
Xiong et al.

(10) Patent No.: US 12,527,265 B1
(45) Date of Patent: Jan. 20, 2026

(54) SELF-WATERING WICKING STRUCTURE AND PLANTING DEVICE

(71) Applicant: Vego Innovations, Inc., Tomball, TX (US)

(72) Inventors: Guang-Yuan Xiong, Tomball, TX (US); Hong-Jie Yan, Shenzhen (CN); Zhu-Lin Liu, Shenzhen (CN)

(73) Assignee: Vego Innovations, Inc., Tomball, TX (US)

( * ) Notice: Subject to any disclaimer, the term of this patent is extended or adjusted under 35 U.S.C. 154(b) by 0 days.

(21) Appl. No.: 18/953,357

(22) Filed: Nov. 20, 2024

(30) Foreign Application Priority Data

Oct. 24, 2024 (CN) .......................... 202422581274.6

(51) Int. Cl.
*A01G 27/04* (2006.01)
*A01G 9/02* (2018.01)

(52) U.S. Cl.
CPC ............. *A01G 27/04* (2013.01); *A01G 9/028* (2013.01)

(58) Field of Classification Search
CPC ...... A01G 27/00; A01G 27/006; A01G 27/02; A01G 27/06
See application file for complete search history.

(56) References Cited

U.S. PATENT DOCUMENTS

| | | | | |
|---|---|---|---|---|
| 5,644,868 A | * | 7/1997 | Lui | A01G 27/06 47/79 |
| 6,125,579 A | * | 10/2000 | Pavelka | A01G 27/02 47/79 |
| 6,226,921 B1 | * | 5/2001 | Kang | A01G 27/06 47/81 |
| 2015/0052808 A1 | * | 2/2015 | Wang | A01G 27/06 47/65.5 |

FOREIGN PATENT DOCUMENTS

| | | | | |
|---|---|---|---|---|
| AU | 2008100918 A4 | * | 10/2008 | ............ A01G 27/04 |
| CA | 2974420 A1 | * | 1/2019 | ............ A01G 9/02 |
| DE | 10125459 A1 | * | 7/2003 | ............ F24F 8/175 |
| KR | 1126188 B1 | * | 3/2012 | ............ A01G 27/02 |
| KR | 1315283 B1 | * | 10/2013 | ............ A01G 24/44 |
| WO | WO-2014106512 A1 | * | 7/2014 | ............ A01G 27/02 |
| WO | WO-2014176709 A1 | * | 11/2014 | ............ A01G 27/06 |
| WO | WO-2023092239 A1 | * | 6/2023 | ............ A01G 27/06 |

* cited by examiner

*Primary Examiner* — Kristen C Hayes
(74) *Attorney, Agent, or Firm* — ScienBiziP, P.C.

(57) ABSTRACT

A self-watering wicking structure and a planting device are provided, including a separator plate, provided with mounting positions, each mounting position is provided with a communication hole, a space above the separator plate forms a planting space, a space below the separator plate forms a storage space; suction columns arranged below the separator plate, the suction columns detachably connected to the mounting positions, each suction column defines a cavity, an upper end of each suction column defines an opening communicating with the cavity, the opening communicated with the communication hole, a lower end of each suction column defines a passage hole communicating with the cavity; planting medium in the planting space can enter the cavity through the communicating hole, liquid in the storage space can enter the cavity through the passage hole. The liquid enters the planting medium in the cavity and is automatically supplied to the plants.

18 Claims, 16 Drawing Sheets

SELF-WATERING WICKING STRUCTURE AND PLANTING DEVICE

CROSS-REFERENCE TO RELATED APPLICATIONS

This application claims priority to Chinese Patent Application No. 202422581274.6 filed on Oct. 24, 2024, in China National Intellectual Property Administration, the contents of which are incorporated by reference herein.

FIELD

The subject matter herein generally relates to plant cultivation technology field, and more particularly to a self-watering wicking structure and a planting device.

BACKGROUND

At present, in places such as gardens and vegetable gardens, planting devices like garden beds are usually adopted to provide a growth environment for plants, for the cultivation of various plants, such as vegetables, flowers, and herbs.

In related arts, the garden bed usually includes a fence, which is enclosed in a circle to form a planting space, the planting space can contain planting medium, such as planting soil, so as to provide support and growth space for the plants. However, garden beds in related arts have technical problems that require users to water frequently and are inconvenient to use.

BRIEF DESCRIPTION OF THE DRAWINGS

Implementations of the present disclosure will now be described, by way of embodiments, with reference to the attached figures.

DETAILED DESCRIPTION

Figure 1:
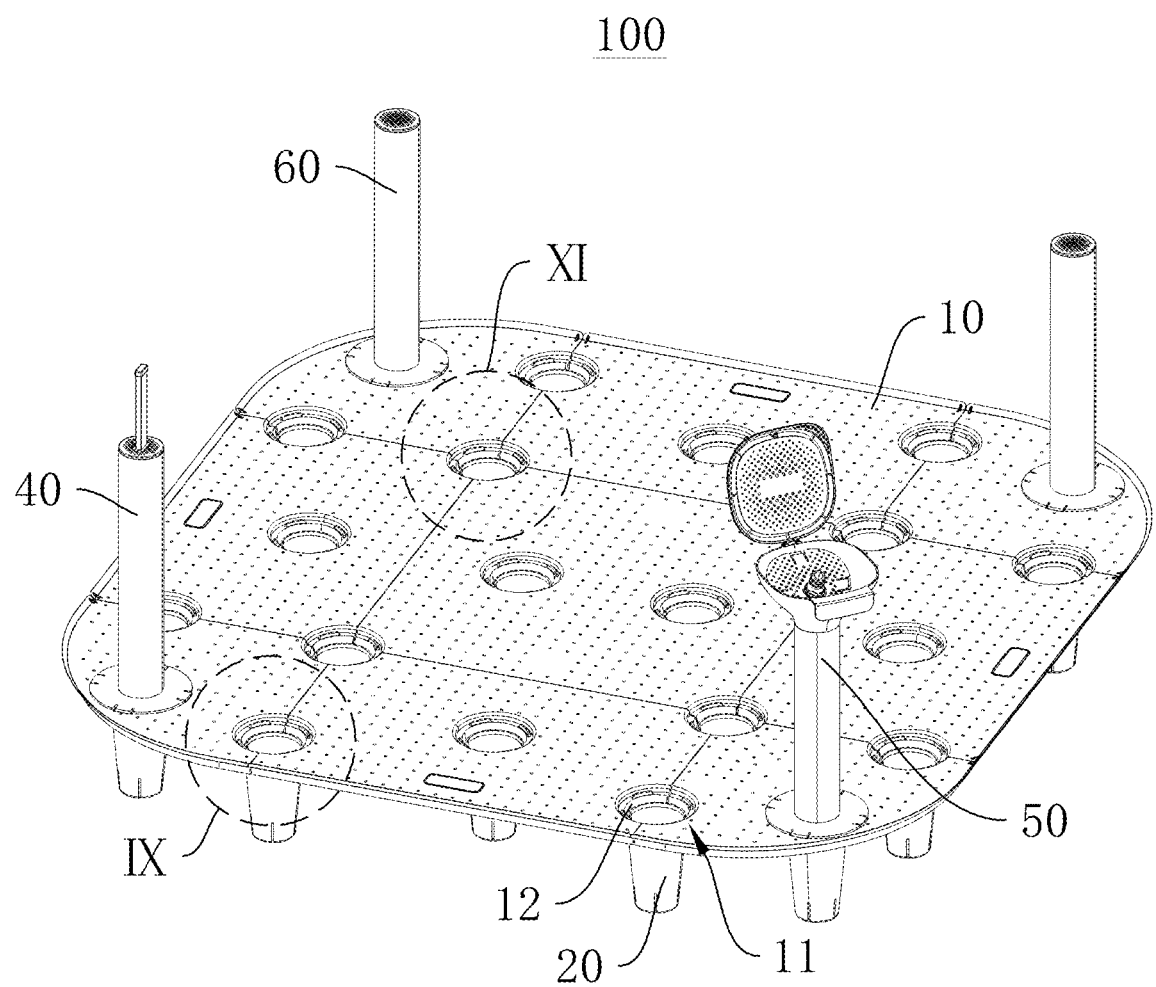
FIG. 1 is a structural diagram of a self-watering wicking structure according to an embodiment of the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present application provides a self-watering wicking structure and a planting device, which have the technical effect of reducing the user's watering frequency and facilitating the user's operation.

The present application firstly provides a self-watering wicking structure.

Figure 2:
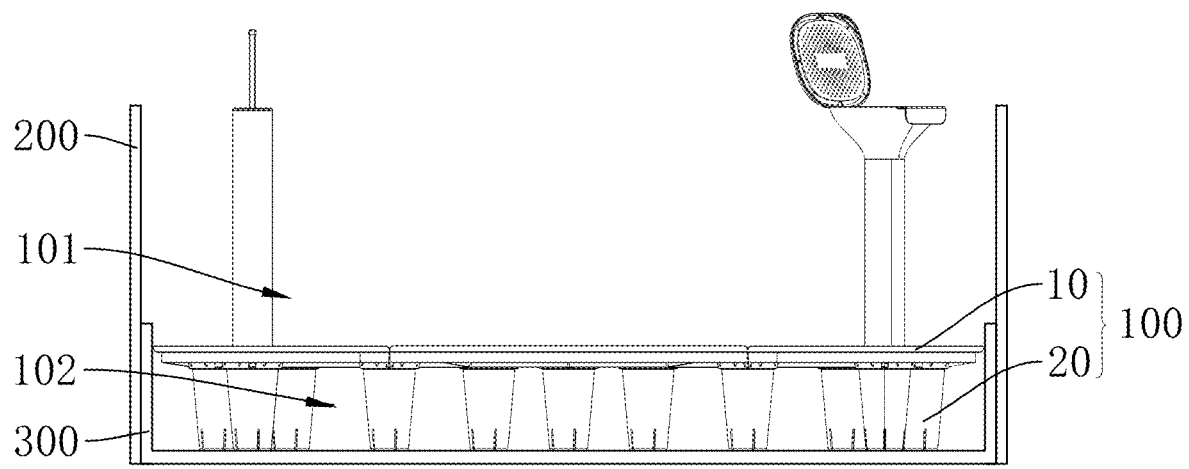
FIG. 2 is an application scenarios diagram of the self-watering wicking structure according to an embodiment of the present application.

FIG. 1 is a structural diagram of the self-watering wicking structure according to an embodiment of the present application. FIG. 2 is an application scenarios diagram of the self-watering wicking structure according to an embodiment of the present application.

Referring to FIGS. 1 and 2, the self-watering wicking structure 100 is applied to a planting device 1000. The planting device 1000 is a fence device, the self-watering wicking structure 100 can be mounted in the fence and form a planting space 101 and a storage space 102 on upper and lower sides respectively. The planting space 101 is used for arranging planting media and plants, and the storage space 102 is used for storing liquids such as planting liquid and water. The planting medium and the plant can obtain the liquid in the storage space 102 through the self-watering wicking structure 100 to achieve a function of automatic watering.

Figure 3:
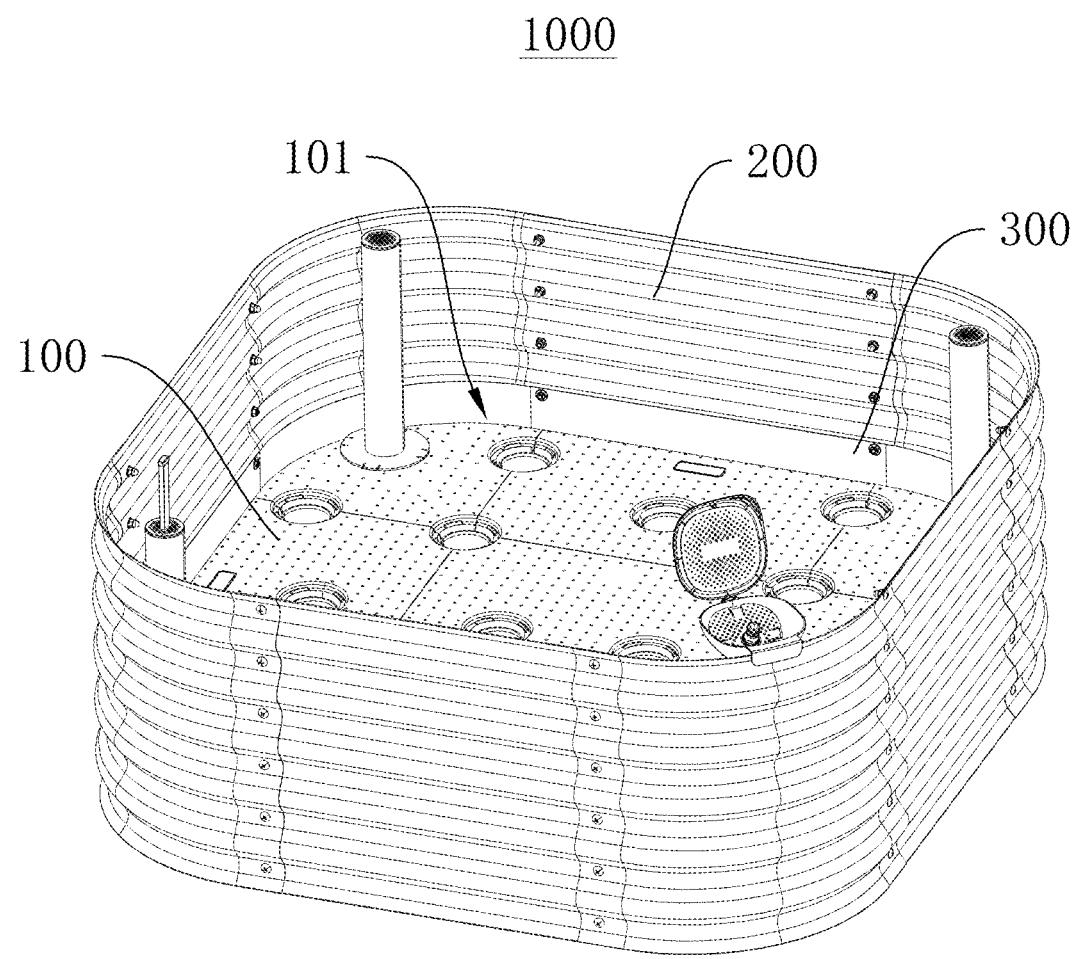
FIG. 3 is a structural diagram of a planting device according to an embodiment of the present application.

FIG. 3 is a structural diagram of the planting device according to an embodiment of the present application.

Referring to FIGS. 2 and 3, for example, the planting device 1000 may include a garden bed 200, a storage member 300, and the self-watering wicking structure 100. The garden bed 200 is a fence structure, the storage member 300 and the self-watering wicking structure 100 are arranged in the garden bed 200. The storage member 300 is used for storing liquid, the storage member 300 is located at a bottom of the garden bed 200. An interior of the storage member 300, an inner wall of the garden bed 200, and a lower part of the self-watering wicking structure 100 form the storage space 102. An upper part of the self-watering wicking structure 100 and the inner wall of the garden bed 200 form the planting space 101.

Figure 4:
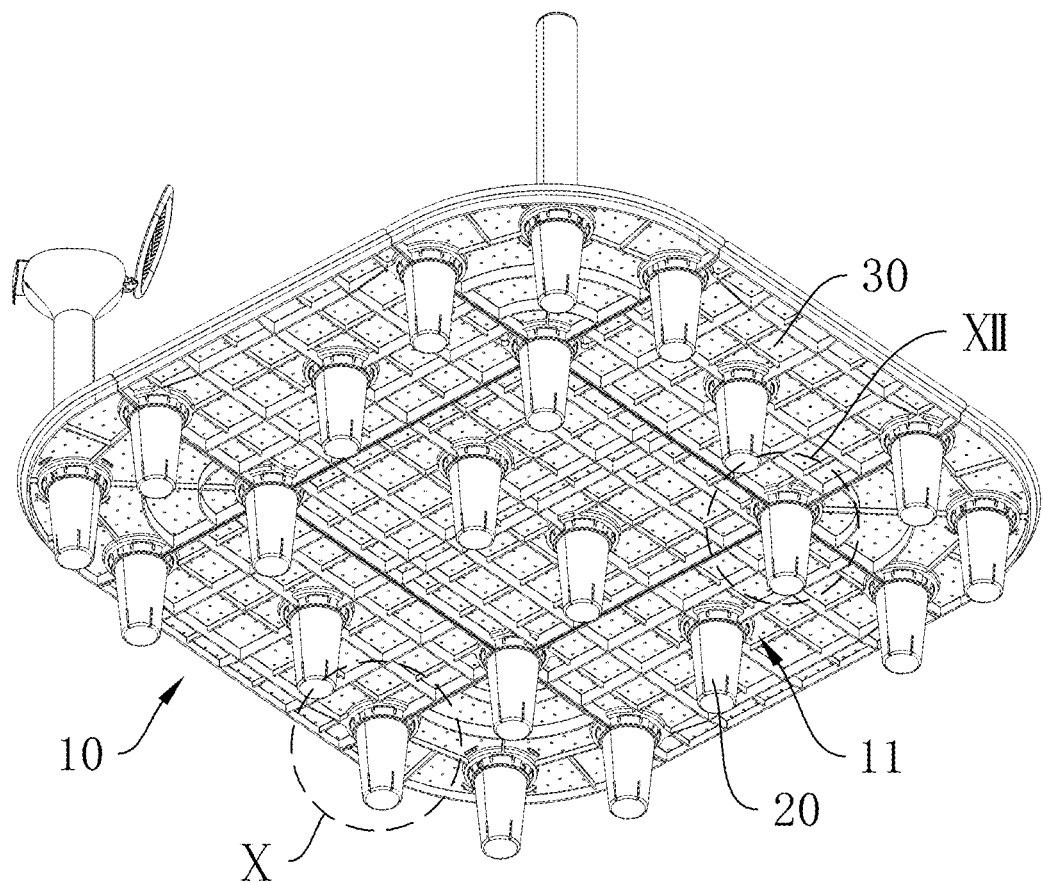
FIG. 4 is a structural diagram of a bottom of the self-watering wicking structure according to an embodiment of the present application.

FIG. 4 is a structural diagram of the bottom of the self-watering wicking structure according to an embodiment of the present application.

Referring to FIGS. 1, 2, and 4, in some embodiments, the self-watering wicking structure 100 includes a separator plate 10 and a plurality of suction columns 20. A space above the separator plate 10 is used to form the planting space 101, a space below the separator plate 10 is used to form the storage space 102. The separator plate 10 is provided with mounting positions 11, each mounting position 11 is provided with a communication hole 12, the communication hole 12 runs through upper and lower sides of the separator plate 10 in the vertical direction.

Figure 5:
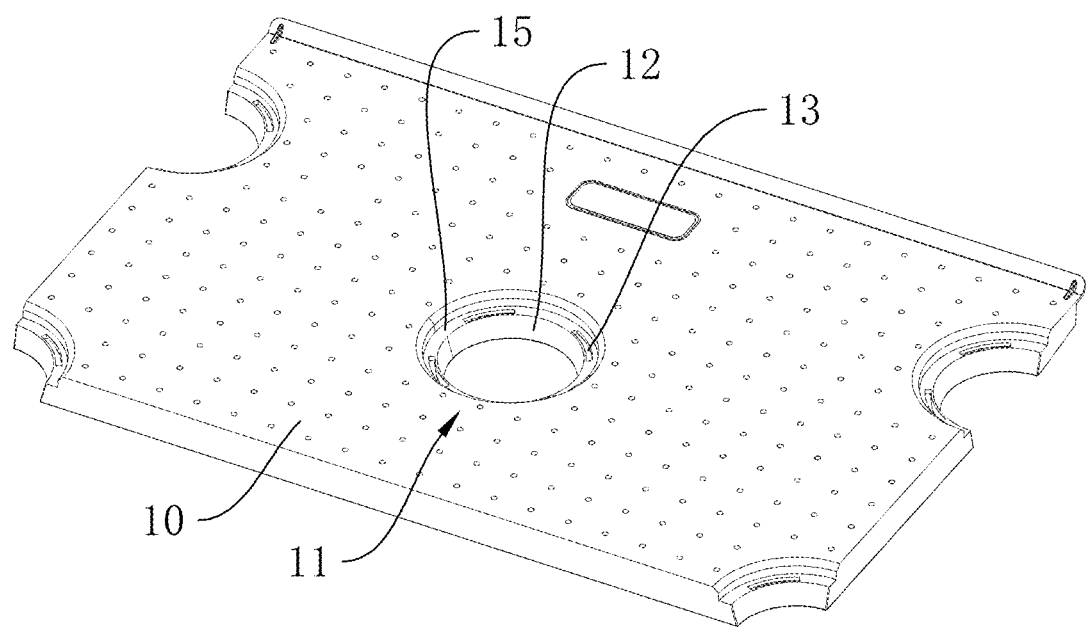
FIG. 5 is an explored view of a suction column and a single board according to an embodiment of the present application.
Figure 5:
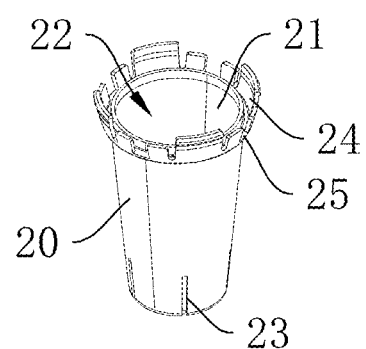

FIG. 5 is an explored view of the suction column and a single board according to an embodiment of the present application.

Referring to FIGS. 2 and 5, the suction columns 20 are arranged below the separator plate 10, each suction column 20 is detachably connected to the mounting position 11. The suction column 20 defines a cavity 21 therein, an upper end of the suction column 20 defines an opening 22 communicating with the cavity 21.

When the suction column 20 is fixed at the mounting position 11, the opening 22 of the suction column 20 is connected with the corresponding communication hole 12. A lower end of the suction column 20 is provided with a passage hole 23 communicating with the cavity 21, and the passage hole 23 penetrates both interior and exterior sides of the suction column 20.

In practical application, planting mediums such as soil can be arranged in planting space 101, planting medium can be planted in plants. Liquid such as planting liquid and water can be stored in storage space 102. The planting medium in planting space 101 can enter the cavity 21 through the communication hole 12, and the liquid in storage space 102 can enter the cavity 21 through the passage hole 23. The liquid can penetrate into the planting medium located in the cavity 21 and supply to the plant to achieve automatic watering function.

Thus, by storing a large amount of liquid in the storage space 102, the water supply to the planting medium and plants can be maintained for a period of time, reducing a frequency of users needing to water the planting medium or plants, which is convenient for users to use.

In some embodiments, a number of the suction columns 20 is greater than or equal to 2, the plurality of suction columns 20 are distributed at intervals. The plurality of suction columns 20 can receive the planting medium through the cavity 21 and allow the liquid to penetrate into the planting medium, thereby improving a watering uniformity.

Figure 6:
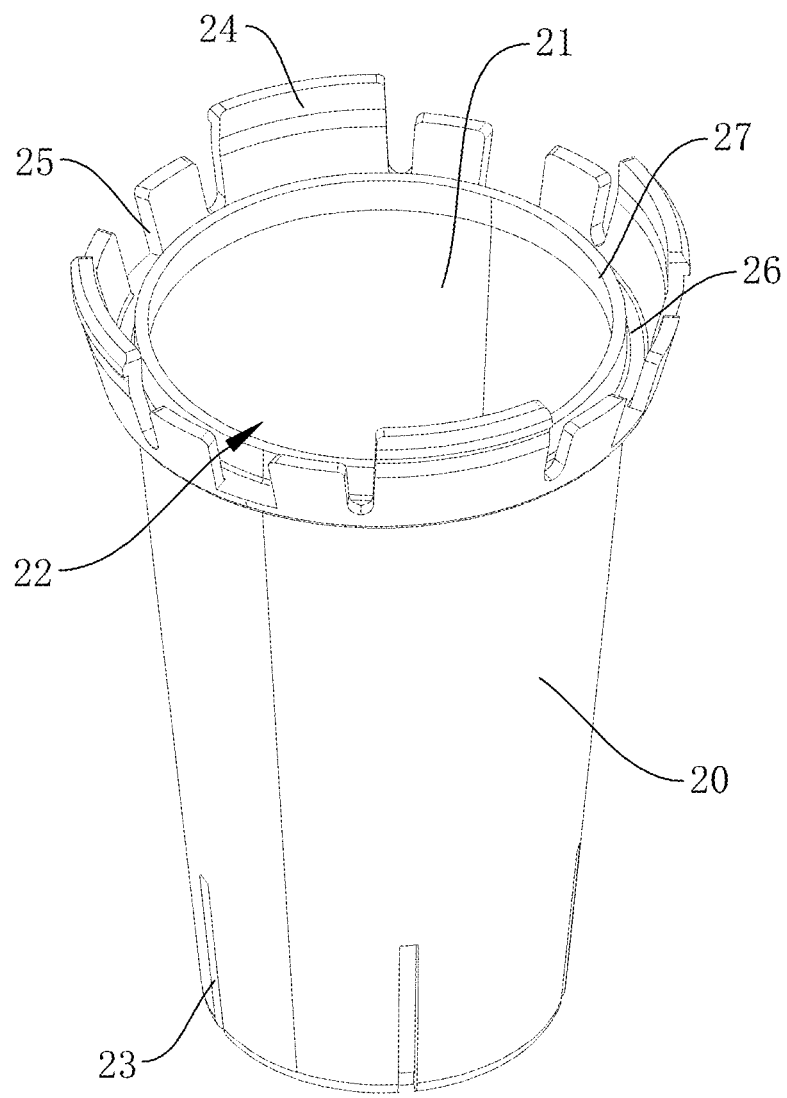
FIG. 6 is a structural diagram of the suction column according to an embodiment of the present application.

FIG. 6 is a structural diagram of the suction column according to an embodiment of the present application.

Referring to FIGS. 5 and 6, in some embodiments, the suction column 20 is substantially cylinder shaped, so that the cavity 21 is formed inside the suction column 20, and an inner diameter of the suction column 20 gradually increases from the bottom to the top.

In some embodiments, an upper end of the suction column 20 is provided with a plurality of clasps 24. For example, the clasps 24 and suction column 20 are formed integrated. The clasps 24 are formed by extending upward from the end of suction column 20, and the side of the clasp 24 protrudes in a direction away from an axis of suction column 20 to form a clipped convex edge.

The mounting position 11 of the separator plate 10 defines a plurality of latch holes 13. The latch holes 13 run vertically through the separator plate 10. Each latch hole 13 is compatible with the clasp 24. The clasp 24 connects to and latches to the latch hole 13.

An assembly of the suction column 20 and separator plate 10 can be realized by connecting the clasp 24 to the latch hole 13 and resisting the clipped convex edge to the separator plate 10. By bending the clasp 24, the clasp 24 can be drawn from the latch hole 13 to remove the suction column 20 and the separator plate 10. In this way, the suction column 20 and the separator plate 10 can be disassembled by latching mode, which is convenient for the user to assemble or disassemble.

In some embodiments, each suction column 20 is provided with a plurality of clasps 24, which are distributed along a circumferential direction of the suction column 20 at intervals. Accordingly, each mounting position 11 is provided with a plurality of latch holes 13, so that the plurality of clasps 24 can be connected with the plurality of latch holes 13. For example, a number of the clasps 24 configured for each suction column 20 is four, the four clasps 24 are distributed along the circumferential direction of the suction column 20 at intervals.

The suction column 20 can be fixed to the separator plate 10 through the plurality of clasps 24, so as to improve a mounting stability between the suction column 20 and the separator plate 10.

In some embodiments, the upper end of the suction column 20 is provided with a plurality of displacement holes, which are distributed on both sides of the clasp 24. The displacement holes can provide a certain displacement space for the deformation of the clasp 24, so that the clasp 24 is easier to bend under the force, and it is convenient for the user to assemble or disassemble.

In some embodiments, the upper end of the suction column 20 is provided with a plurality of positioning holes 25. Positioning structures of the bottom of the separator plate 10 can be fixed to the positioning holes 25.

The suction column 20 can be positioned to the separator plate 10 through the positioning holes 25, to limit a mounting angle of the suction column 20 relative to the separator plate 10, which is convenient for the user to assemble or disassemble, and improving the mounting stability of the suction column 20 and the separator plate 10.

In some embodiments, the suction column 20 is provided with the plurality of positioning holes 25, the plurality of positioning holes 25 are distributed along the circumferential direction of the suction column 20 at intervals. For example, each suction column 20 is provided with four positioning holes 25, the four positioning holes 25 are distributed along the circumferential direction of the suction column 20 at intervals.

The suction column 20 can be positioned with the separator plate 10 through the plurality of positioning holes 25 to improve the mounting stability between the suction column 20 and the separator plate 10.

Figure 7:
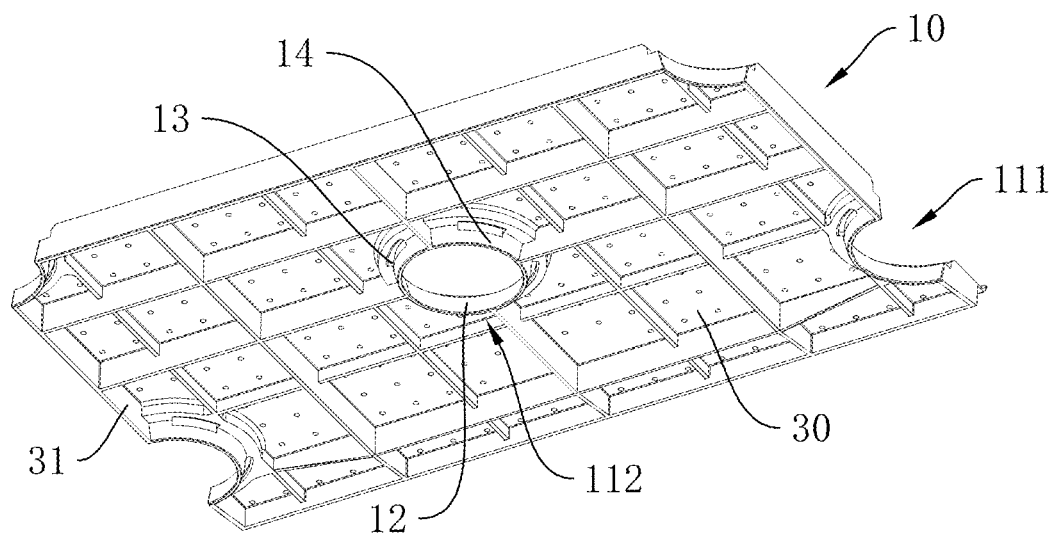
FIG. 7 is a structural diagram of the single board according to an embodiment of the present application.

FIG. 7 is a structural diagram of the single board according to an embodiment of the present application.

Referring to FIGS. 5, 6, and 7, in some embodiments, the upper end of the suction column 20 defines a slot 26, the slot 26 is defined along a circumferential direction of the opening 22. For example, the upper end of the suction column 20 is provided with an inner convex ring 27, the inner convex ring 27 is arranged on an inside of the suction column 20, the inner convex ring 27 is distributed along the circumferential direction of the opening 22, the plurality of clasps 24 are distributed around the inner convex ring 27, and a spacing between the inner convex ring 27 and the plurality of clasps 24 is provided to form the slot 26.

An insertion portion 14 is arranged at the bottom of the mounting position 11 of the separator plate 10. The insertion portion 14 is arranged along the circumferential direction of the communication hole 12. For example, the insertion portion 14 is formed by the downward extension of the separator plate 10, and a top side of the mounting position 11 is recessed downward to form a curved groove 15. The insertion portion 14 and curved groove 15 are arranged around the communication hole 12, and the latch hole 13 passes through the curved groove 15 and the insertion portion 14.

When the suction column 20 is fixed on the separator plate 10, the insertion portion 14 can be inserted into slot 26, that is, the insertion portion 14 can be inserted between clasps 24 and the inner convex ring 27 to improve the connection fit between the suction column 20 and the separator plate 10 and reduce the gap between the suction column 20 and the separator plate 10.

Furthermore, when the separator plate 10 and the suction column 20 are fixed together, the inner convex ring 27 and the latch hole 13 are positioned from the inside and outside of the insertion portion 14 respectively, greatly improving the connection stability between the separator plate 10 and the suction column 20.

Referring to FIGS. 2 and 4, in some embodiments, the bottom surface of the suction column 20 forms a support surface, which is used to contact a fixed object so that the suction column 20 can be stably placed on the fixed object. For example, the fixed object may be the bottom of the inner side of the storage member 300, and the suction column 20 may contact the inner side of the storage member 300 through the support surface, so that the suction column 20 can be stably placed in the storage member 300, and the suction column 20 may support the separator plate 10, so that a certain distance is left below the separator plate 10 to form the storage space 102.

On another hand, there is a plurality of suction columns 20 provided in this embodiment, which can support the separator plate 10 from a plurality of positions at the same time to improve the support stability of the separator plate 10.

Referring to FIGS. 2 and 6, in some embodiments, the passage hole 23 runs through the side and bottom of the lower end of the suction column 20. For example, the passage hole 23 is arranged as a whole in a long strip extending along a length direction of the suction column 20.

The liquid in the storage space 102 can penetrate into the cavity 21 from the lower side surface and the bottom surface of the suction column 20 to improve a liquid utilization rate.

In some embodiments, the suction column 20 is provided with the plurality of passage holes 23, the plurality of passage holes 23 are distributed along the circumferential direction of the suction column 20 at intervals. For example, a number of passage holes 23 configured for each suction column 20 is four. The four passage holes 23 are distributed along the circumferential direction of the suction column 20 at intervals.

The suction column 20 can be used to infiltrate the liquid in the storage space 102 through the plurality of passage holes 23 to improve the efficiency of water infiltration.

Figure 8:
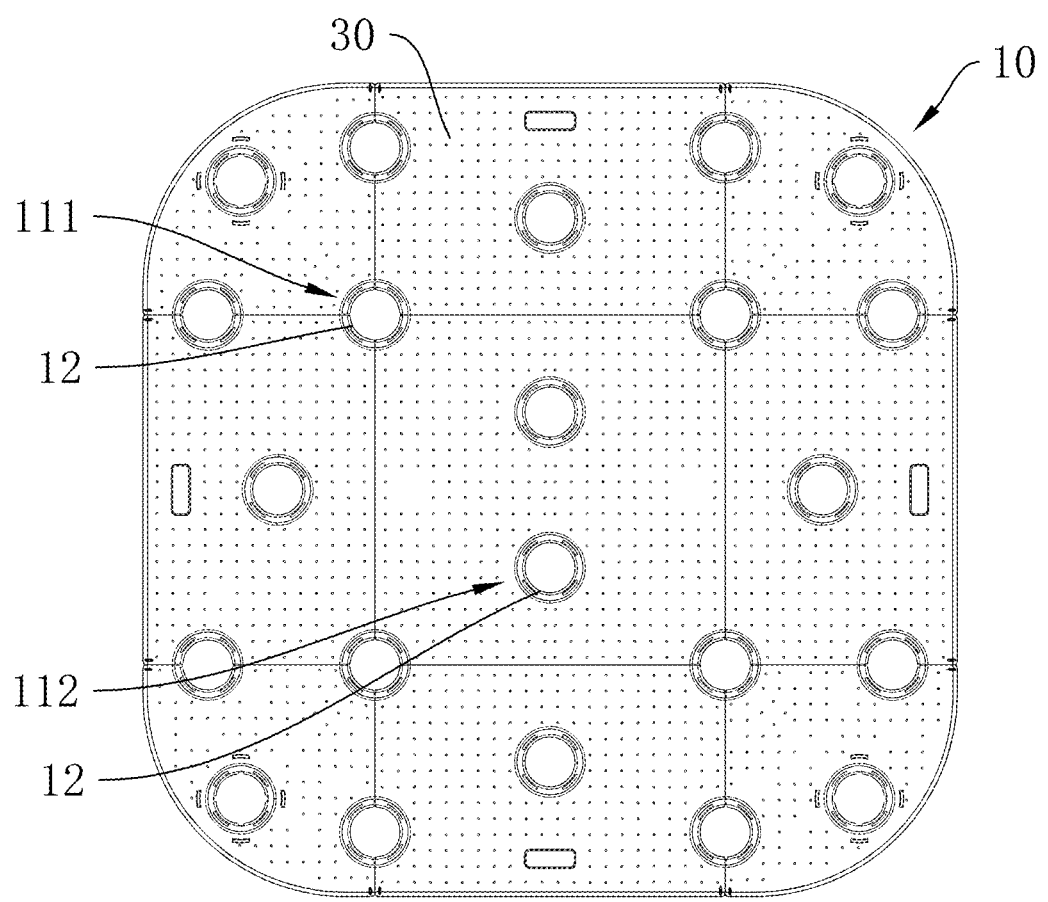
FIG. 8 is a status diagram of multiple single boards when combined according to an embodiment of the present application.

FIG. 8 is a status diagram of multiple single boards when combined according to an embodiment of the present application.

Referring to FIG. 8, in some embodiments, the separator plate 10 includes a plurality of single boards 30, adjacent single boards 30 can be disassembled and assembled so that adjacent single boards 30 can be combined to form a whole. For example, the plurality of single boards 30 can be distributed in matrix mode, and the plurality of single boards 30 can be set in tiles.

The separator plate 10 can be divided into the plurality of single boards 30, and the plurality of single boards 30 can also be combined to form a whole separator plate 10 to facilitate product transportation and handling.

In some embodiments, a total number of the single boards 30 is nine. In other embodiments, the total number of the single boards 30 can be set to other values, which can be set based on actual requirements, such as a total area of the separator plate 10 and an area of the single board 30.

Referring to FIGS. 4 and 8, in some embodiments, the plurality of adjacent single boards 30 can be detachable connected through the suction columns 20.

When the plurality of adjacent single boards 30 are fixed to the suction column 20 at the same time, the adjacent single boards 30 can be relatively fixed to realize the splicing and combination of the plurality of adjacent single boards 30, which prevents the edge warping and deformation of the single boards 30 and prevents the soil exposure caused by large gaps between single boards 30. In addition, on the basis of providing the watering effect on plants and the overall supporting effect on the separator plate 10, the suction column 20 can also improve the fixing effect on the plurality of adjacent single boards 30, optimize the device structure, and the design is more exquisite.

Referring to FIGS. 4 and 7, in some embodiments, the mounting positions 11 may include first mounting positions 111 and second mounting positions 112. The first mounting position 111 is disposed at the edge of the single board 30, the communication hole 12 is formed between the first mounting position 111 of the adjacent multiple single boards 30, and the first mounting positions 111 of the adjacent multiple single boards 30 are all detachably connected to the suction column 20, so that the adjacent multiple single boards 30 can be spliced and combined.

The first mounting positions 111 of the adjacent multiple single boards 30 can enclose and form the communication hole 12, so that the communication hole 12 is formed between the multiple single boards 30. When the plurality of single boards 30 are fixed to the same suction column 20 at the same time, the communication holes 12 between the plurality of single boards 30 can communicate with the cavity 21 of the corresponding suction column 20.

The detachable connection between the first mounting position 111 and the suction column 20 is a splice fit. The first mounting position 111 can be configured according to the number or position of the splicing.

Figure 9:
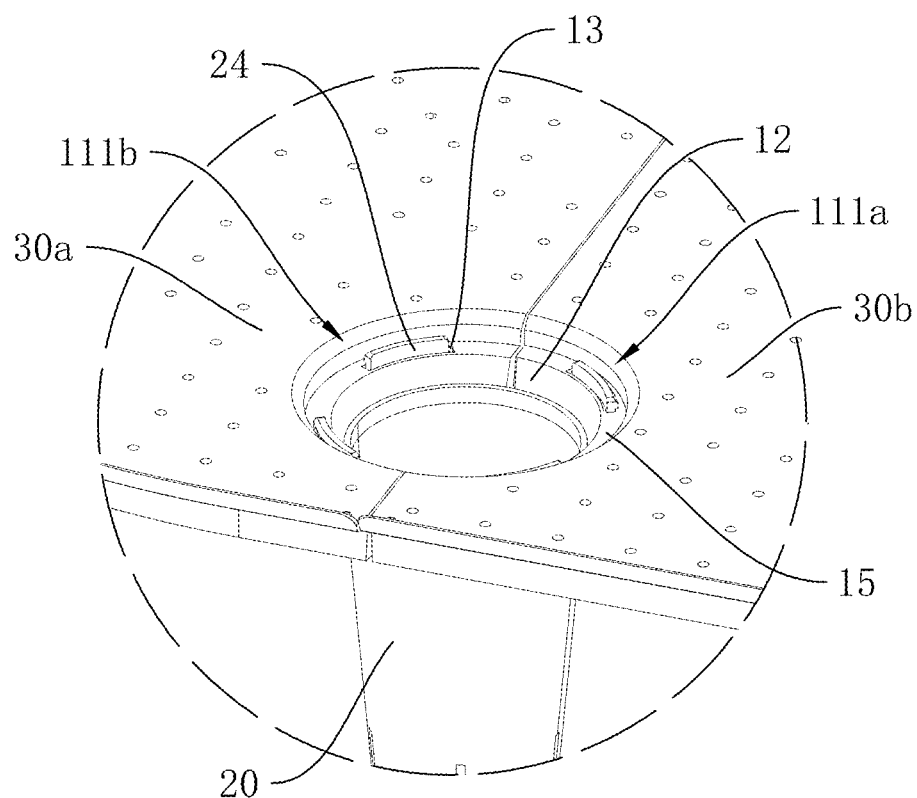
FIG. 9 is a partial enlarged diagram of IX in FIG. 1.
Figure 10:
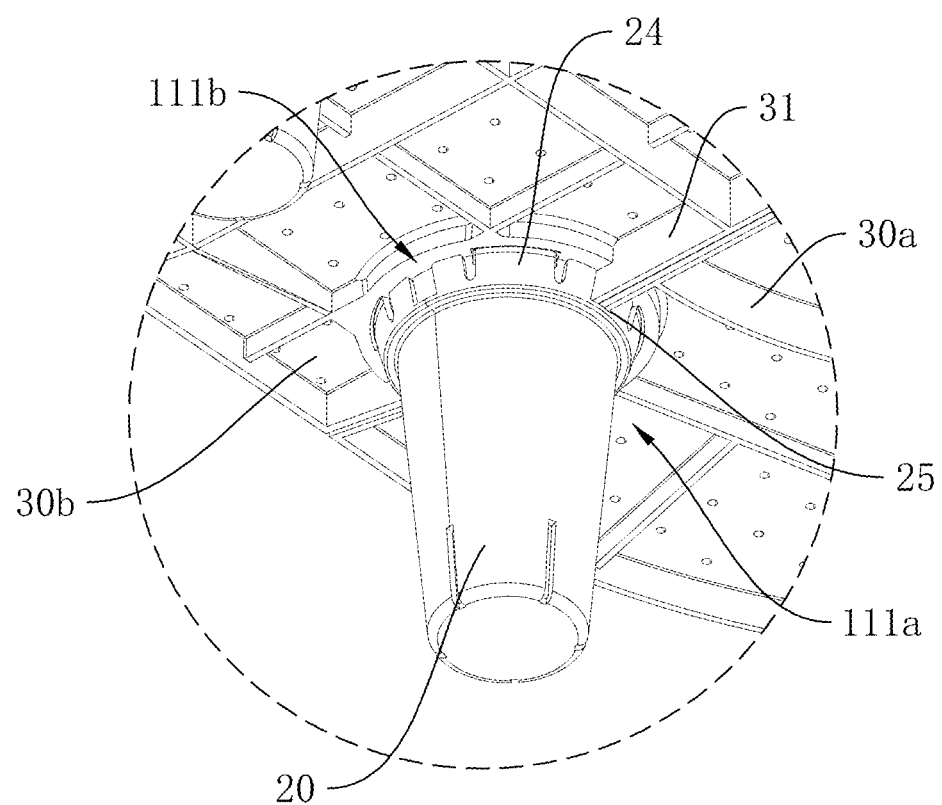
FIG. 10 is a partial enlarged diagram of X in FIG. 4.

FIG. 9 is a partial enlarged diagram of IX in FIG. 1. FIG. 10 is a partial enlarged diagram of X in FIG. 4.

Referring to FIGS. 9 and 10, for example, the number of the single boards 30 spliced and fixed to the same suction column 20 may be two. The two single boards 30 are a single board 30a and a single board 30b, a first mounting position 111a of the single board 30a and a first mounting position 111b of the single board 30b are combined to form the communication hole 12. A portion of the suction column 20 is spliced and fixed to the single board 30a, and another portion of the suction column 20 is spliced and fixed to the single board 30b, so that the single board 30a and the single board 30b are spliced and fixed. Exemplarily, the first mounting position 111a of the single board 30a and the first mounting position 111b of the single board 30b are respectively provided with two latch holes 13, two of the clasps 24 of the suction column 20 are spliced and fixed to the two latch holes 13 of the single board 30a, and the other two clasps 24 of the suction column 20 are spliced and fixed to the two latch holes 13 of the single board 30b.

Figure 11:
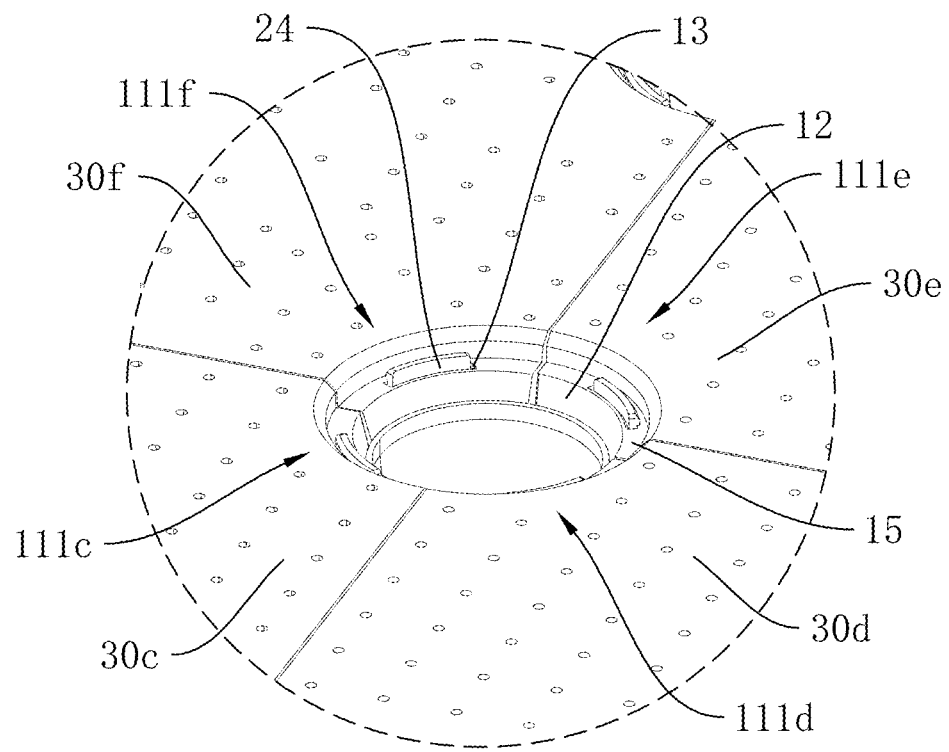
FIG. 11 is a partial enlarged diagram of XI in FIG. 1.
Figure 12:
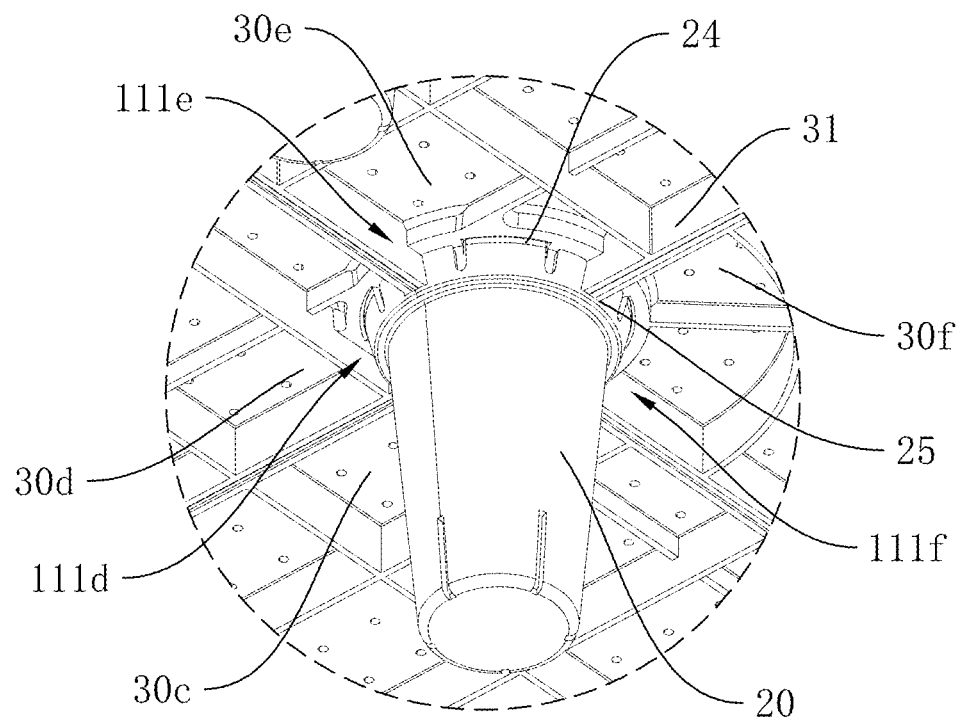
FIG. 12 is a partial enlarged diagram of XII in FIG. 4.

FIG. 11 is a partial enlarged diagram of XI in FIG. 1. FIG. 12 is a partial enlarged diagram of XII in FIG. 4.

Referring to FIGS. 11 and 12, for example, the number of the single boards 30 spliced and fixed to the same suction column 20 may be four. For example, the four single boards 30 are a single board 30c, a single board 30d, a single board 30e, and a single board 30f. A first mounting position 111c of the single board 30c, a first mounting position 111d of the single board 30d, a first mounting position 111e of the single board 30e, and a first mounting position 111f of the single board 30f are combined to form the communication hole 12. One of the clasps 24 of the suction column 20 is spliced and fixed to the single board 30a, one of the clasps 24 of the suction column 20 is spliced and fixed to the single board 30b, one of the clasps 24 of the suction column 20 is spliced and fixed to the single board 30c, and one of the clasps 24 of the suction column 20 is spliced and fixed to the single board 30d, so that the single board 30c, the single board 30d, the single board 30e, and the single board 30f are spliced and fixed. Exemplarily, the first mounting position 111c of the single board 30c, the first mounting position 111d of the single board 30d, the first mounting position 111e of the single board 30e, and the first mounting position 111f of the single board 30f are respectively provided with a latch hole 13, the four clasps 24 of the suction column 20 are respectively spliced and fixed to the latch holes 13 of the single board 30c, the single board 30d, the single board 30e, and the single board 30f.

In other embodiments, the number of single boards 30 spliced and fixed to the same suction column 20 can also be other values, which can be specifically configured according to the actual application scenario, and this application does not limit this.

Referring to FIGS. 5 and 7, in some embodiments, the second mounting position 112 may be arranged in a middle portion of the single board 30, a middle portion of the second mounting position 112 defines the communication hole 12, so that the second mounting position 112 of the single board 30 is formed with the communication hole 12.

The detachable connection between the second mounting position 112 and the suction column 20 is a splice fit. The specific method of the splice fit can be found in the relevant description of the aforementioned embodiment, and the present application will not repeat it here.

The shape and size of each single board 30 can be configured according to actual needs, and the number of the first mounting position 111 or the second mounting position 112 set on each single board 30 can also be configured according to actual needs, and this application does not impose any restrictions on this.

Referring to FIGS. 5 and 10, in some embodiments, the bottom surface of the single board 30 is provided with ribs 31. The ribs 31 can increase the mechanical strength of the single board 30 itself and improve the supporting ability of the single board 30.

In some embodiments, the ribs 31 are located at the edge of the single board 30, and the position of the ribs 31 passes through the first mounting position 111. The ribs 31 can be used as a positioning structure to cooperate with the positioning hole 25 of the suction column 20. When the plurality of single boards 30 are fixed to the same suction column 20 at the same time, the ribs 31 of the adjacent multiple single boards 30 are inserted into the positioning holes 25 of the corresponding suction column 20.

The suction column 20 can position the plurality of single boards 30 through the cooperation of the positioning holes 25 and the ribs 31, thereby improving the splicing stability between the plurality of single boards 30.

In some embodiments, the plurality of positioning holes 25 and the plurality of clasps 24 are arranged in a staggered way, that is, the positioning hole 25 are located between at least two adjacent clasps 24, and the clasp 24 is located between at least two adjacent positioning holes 25. In this way, the plurality of positioning holes 25 and the plurality of clasps 24 cooperate with each other to perform fixing and inserting positioning at multiple positions around the suction column 20, further improving the connection stability of the suction column 20.

The suction column 20 provided in the present application is detachably connected to the separator plate 10 by the clamping way. In other embodiments, the suction column 20 can also be detachably connected to the separator plate 10 by bolting, latching, locking, etc., and the present application does not impose any restrictions on this.

Referring to FIGS. 1 and 2, in some embodiments, the self-watering wicking structure 100 further includes functional members. The functional members are detachably connected to the separator plate 10. The functional members may be connected to the storage space 102 through the suction columns 20, the functional members may provide supporting functions for automatic watering of plants. For example, the functional members can show the amount of liquid in the storage space 102, the functional members can add liquid to the storage space 102, the functional members can provide air circulation conditions for the storage space 102, etc. Correspondingly, the functional members can include one or more of a buoyage 40, a filling member 50, and an air permeable member 60.

The user can configure the functional members according to his/her own needs, and mounting or remove the functional members in the corresponding suction column 20 to increase or reduce the corresponding functions of the self-watering wicking structure 100, thereby realizing personalized functional design and facilitating user use.

To ensure that the self-watering wicking structure 100 can realize the function of automatic watering, there should be at least one of the plurality of suction column 20 without functional members mounted. The number and mounting position of the functional members can be configured according to actual needs, and this application does not impose any restrictions on this.

Figure 13:
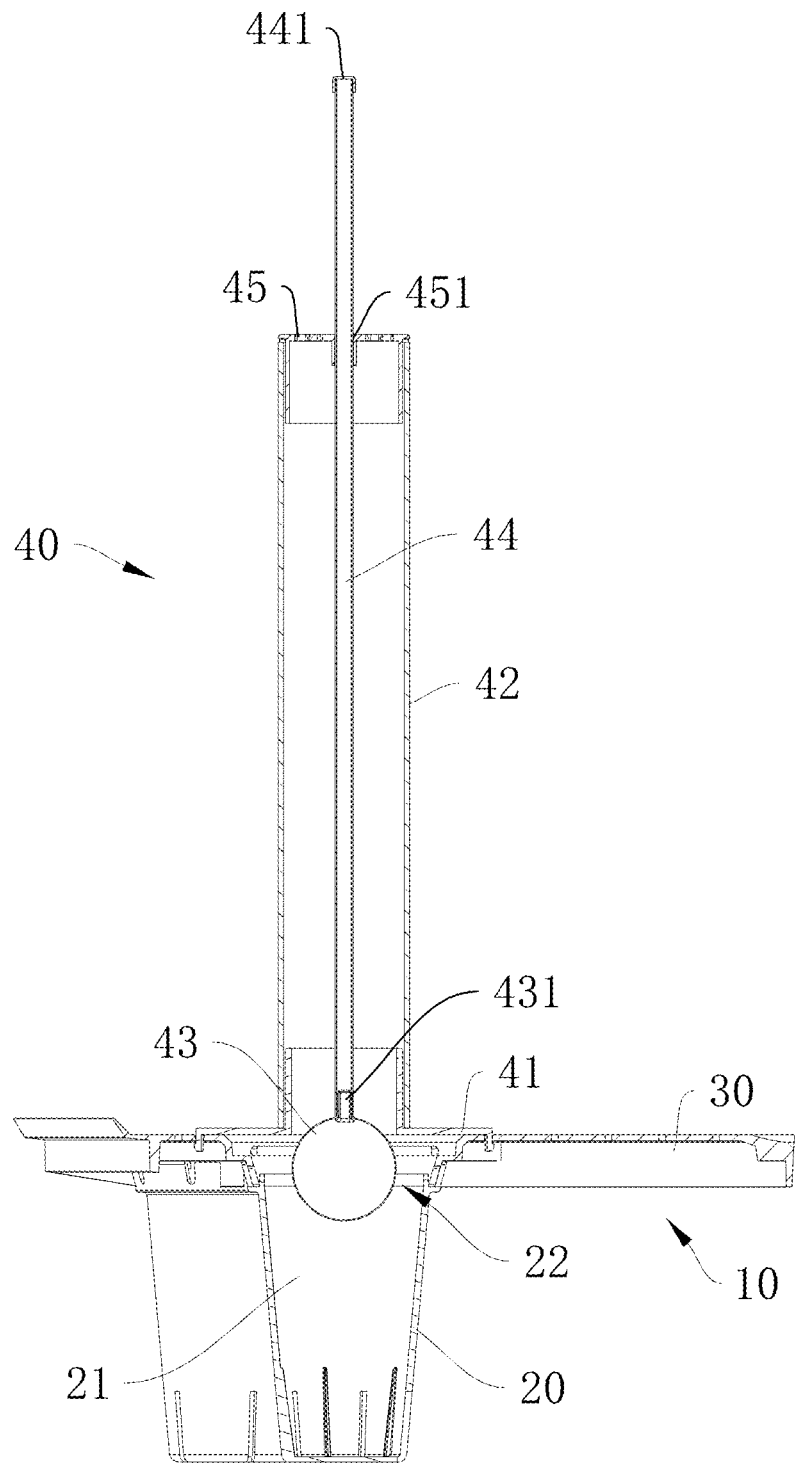
FIG. 13 is a cross-sectional diagram of a buoyage, the single board, and the suction column according to an embodiment of the present application.

FIG. 13 is a cross-sectional diagram of the buoyage, the single board, and the suction column according to an embodiment of the present application.

Referring to FIGS. 2 and 13, in some embodiments, the functional members include the buoyage 40. The buoyage 40 is used to show the amount of liquid in the storage space 102.

The buoyage 40 includes a buoy holder 41, a buoy tube 42, a buoy ball 43, and a water level member 44. The buoy holder 41 is detachably connected to the separator plate 10. The buoy tube 42 is connected to the buoy holder 41, the buoy tube 42 is located above the suction column 20. The buoy ball 43 is arranged in the cavity 21 of the suction column 20. A lower end of the water level member 44 is fixed to the buoy ball 43, and an upper end of the water level member 44 is exposed from the buoy tube 42.

When liquid is stored in the storage space 102, the buoy ball 43 will float on the liquid surface and support the upper end of the buoy tube 42 to be exposed from the buoy tube 42. The user can know the current liquid level of the storage space 102 by observing the exposed height of the upper end of the buoy tube 42, so as to show the user the amount of liquid in the storage space 102.

Exemplarily, the buoy holder 41 is in a ring shape, the buoy holder 41 is clamped and fixed to the separator plate 10. The buoy holder 41 can be clamped and fixed to one or more single boards 30 corresponding to the suction column 20.

An area of the bottom of the buoy holder 41 is greater than an area of the opening 22 of the suction column 20, so that the buoy holder 41 may block the opening 22 of the suction column 20, preventing the planting medium from entering the cavity 21 of the corresponding suction column 20 to interfere with the operation of the buoy ball 43.

Exemplarily, the buoy tube 42 is made of PVC (polyvinyl chloride). The lower end of the buoy tube 42 is inserted and fixed to the buoy holder 41.

Exemplarily, an air permeable cover 45 is provided at the upper end of the buoy tube 42. A plurality of through holes for ventilation are provided on the surface of the air permeable cover 45. The air permeable cover 45 is embedded and fixed to the buoy tube 42. The air permeable cover 45 can provide air circulation conditions for the storage space 102, and can prevent debris from entering the buoy tube 42 from the upper end of the buoy tube 42 to affect the floating of the buoy ball 43. In addition, the air permeable cover 45 and the buoy tube 42 are fixed by plugging, which reduces the production cost and assembly complexity.

The air permeable cover 45 is provided with a limit hole 451, the limit hole 451 runs through a middle portion of the air permeable cover 45, and the limit hole 451 is matched to the water level member 44. A lower end of the water level member 44 is connected to the buoy ball 43, an upper end of the water level member 44 is inserted through the limit hole 451 and exposed from the upper end of the buoy tube 42.

The limit hole 451 has a limiting effect on the water level member 44, which can reduce the risk of the water level member 44 tipping over and ensure that the water level member 44 can float up and down normally.

Exemplarily, the buoy ball 43 is made of environmentally friendly materials through a blow molding process, that is, the buoy ball 43 is a blow-molded hollow part, has better buoyancy, is more environmentally friendly, is not easy to corrode, and the material is recyclable.

A diameter of the buoy ball 43 is larger than an inner circle diameter of the buoy holder 41, so that the buoy ball 43 cannot pass through the inner circle of the buoy holder 41, thereby restricting the buoy ball 43 in the cavity 21 of the suction column 20 to prevent the buoy ball 43 from detaching from the suction column 20 due to excessive water level.

A top portion of the buoy ball 43 is provided with a mounting block 431. The mounting block 431 is used to secured the water level member 44.

Exemplarily, the water level member 44 is substantially tubular, so that the inside of the water level member 44 is hollow, and the lower end of the water level member 44 is plugged and fixed to the mounting block 431, so that the water level member 44 is fixedly connected to the buoy ball 43. The hollow setting of the water level member 44 can reduce the weight of the water level member 44, so that the water level member 44 and the buoy ball 43 have better buoyancy. In addition, the water level member 44 and the buoy ball 43 are fixed by plugging, which reduces the production cost and assembly complexity.

The upper end of the water level member 44 is provided with a dust plug 441, which is sleeved on the upper end of the water level member 44. The dust plug 441 can prevent debris from entering the water level member 44 from the upper end of the water level member 44 and affecting the buoy of the water level member 44.

Figure 14:
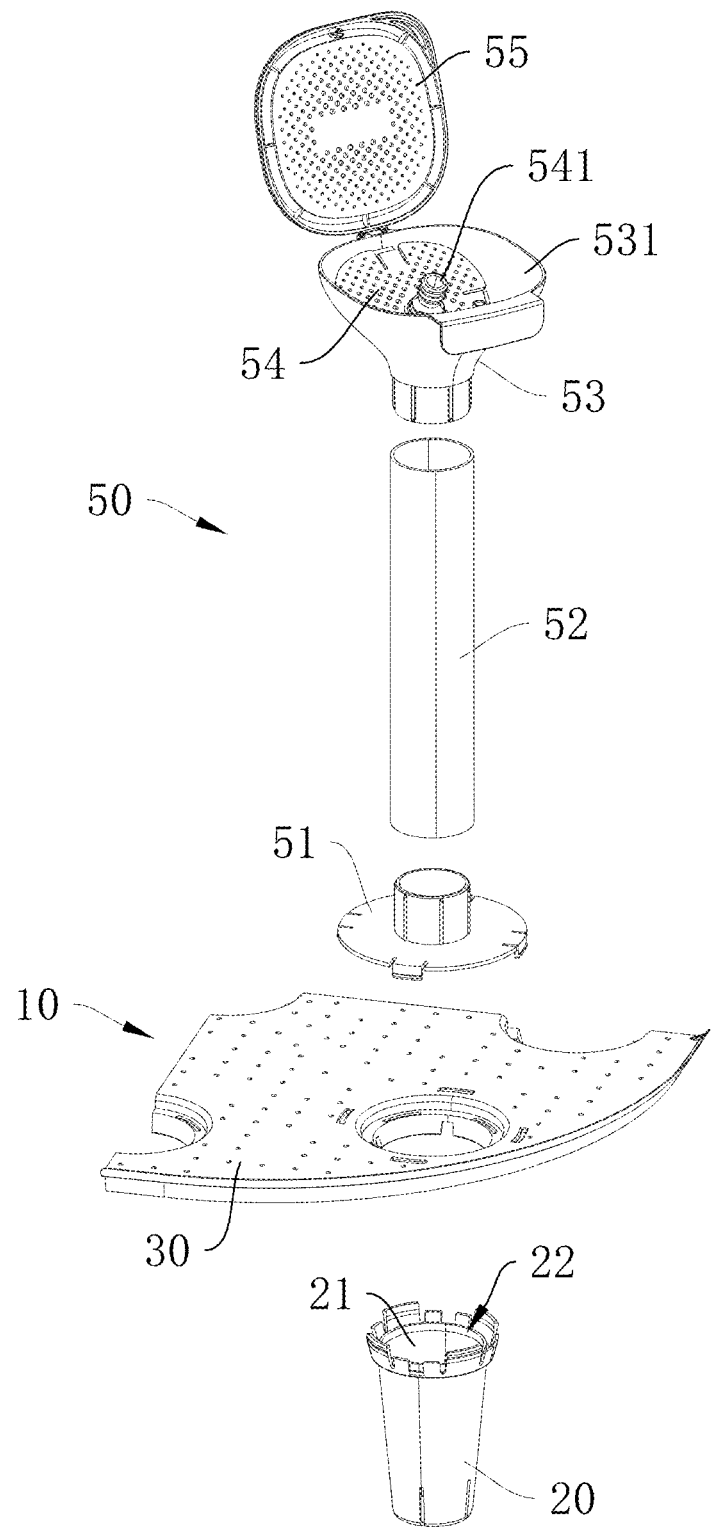
FIG. 14 is an explored diagram of a filling member, the single board, and the suction column according to an embodiment of the present application.

FIG. 14 is an explored diagram of a filling member, the single board, and the suction column according to an embodiment of the present application.

Referring to FIGS. 2 and 14, in some embodiments, the functional members include a filling member 50. The filling member 50 allows the user to add liquid to the storage space 102.

The filling member 50 includes a filling holder 51, a filling pipe 52 and a filling head 53. The filling holder 51 is detachably connected to the separator plate 10. The filling pipe 52 is connected to the filling holder 51, and the filling pipe 52 is located above the suction column 20. A lower end of the filling pipe 52 is connected to the cavity 21 of the suction column 20. The filling head 53 is arranged at an upper end of the filling pipe 52.

When liquid needs to be added to the storage space 102, the user can add the liquid to the filling head 53, so that the liquid enters the suction column 20 through the filling pipe 52, and enters the storage space 102 through the passage hole 23 of the suction column 20. In this way, the user does not need to open and disassemble or open the separator plate 10 to add liquid to the storage space 102, which is convenient for the user.

Exemplarily, the filling holder 51 is annular, the filling holder 51 is clamped and fixed to the separator plate 10. The filling holder 51 can be clamped and fixed to one or more single boards 30 corresponding to the suction column 20.

A bottom area of the filling holder 51 is larger than the area of the opening 22 of the suction column 20, so that the filling holder 51 can cover the opening 22 of the suction column 20 to prevent the planting medium from entering the cavity 21 of the corresponding suction column 20 and causing blockage.

Exemplarily, the filling pipe 52 is made of PVC (polyvinyl chloride). The lower end of the filling pipe 52 is plugged and fixed to the filling holder 51.

Exemplarily, the filling head 53 is cup-shaped, a filling cavity 531 is formed inside the filling head 53, the filling cavity 531 runs through the bottom of the filling head 53. The lower end of the filling head 53 is plugged and fixed to the upper end of the filling pipe 52, so that the filling cavity 531 is connected to the inside of the filling pipe 52. The filling head 53 and the filling pipe 52 are detachably connected by plugging, which is convenient for users to assemble or disassemble.

Exemplarily, a filter plate 54 is provided inside the filling head 53, the filter plate 54 is clamped and fixed to the inner side of the filling head 53. A plurality of through holes for air permeability are provided on a surface of the filter plate 54. The filter plate 54 can provide air flow conditions for the storage space 102 on one hand, and prevent debris from entering the filling pipe 52 from the filling head 53 to cause blockage on the other hand.

The filter plate 54 is provided with a quick connector 541, the quick connector 541 is used for docking with a water pipe. When it is necessary to add liquid to the storage space 102, the user can sleeve the water pipe on the quick connector 541, and add liquid to the filling head 53 through the water pipe, which is convenient for the user to operate.

Exemplarily, a cover plate 55 is provided on one side of the filling head 53, the cover plate 55 is rotatably connected to the filling head 53. A plurality of through holes for air permeability are provided on a surface of the cover plate 55.

The cover plate 55 has an open state and a closed state that can be switched by rotation. When the cover plate 55 is in the open state, the cover plate 55 allows the filling cavity 531 and the quick connector 541 to be exposed, so that the user can add liquid to the filling head 53.

When the cover plate 55 is in the closed state, The cover plate 55 covers on the filling head 53 and shields the filling cavity 531, thereby protecting the quick connector 541 and preventing debris from entering the filling cavity 531. At the same time, the cover plate 55 can still provide air circulation conditions for the storage space 102.

Figure 15:
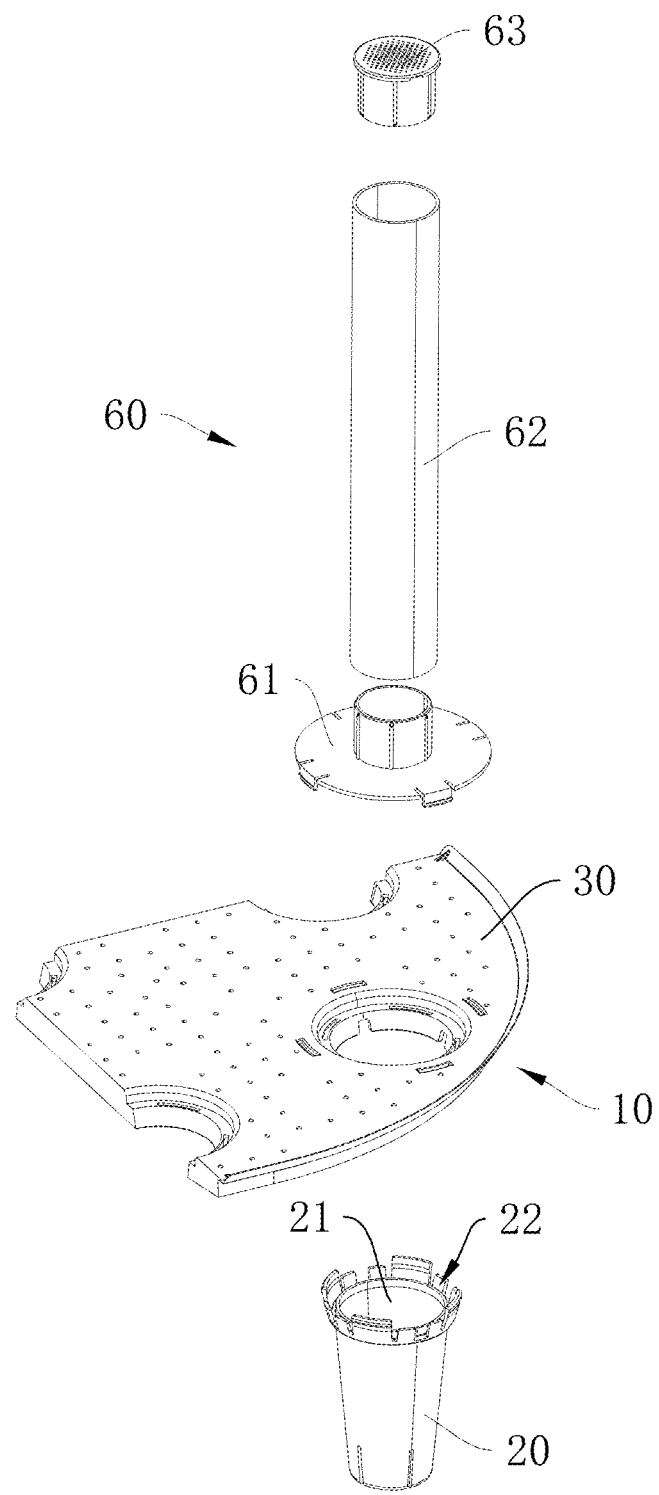
FIG. 15 is an explored diagram of an air permeable member, the single board, and the suction column according to an embodiment of the present application.

FIG. 15 is an explored diagram of an air permeable member, the single board, and the suction column according to an embodiment of the present application.

Referring to FIGS. 2 and 15, in some embodiments, the functional members include an air permeable member 60. The air permeable member 60 may provide air circulation conditions for the storage space 102.

The air permeable member 60 includes an air permeable holder 61, an air permeable tube 62, and a dust cover 63. The air permeable holder 61 is detachably connected to the separator plate 10. The air permeable tube 62 is connected to the air permeable holder 61, the air permeable tube 62 is located above the suction column 20, a lower end of the air permeable tube 62 is connected to the cavity 21 of the suction column 20. The dust cover 63 is arranged at an upper end of the air permeable tube 62, the dust cover 63 is provided with a plurality of air permeable holes.

The storage space 102 can be communicated with the external space of the self-watering wicking structure 100 through the suction column 20, the air permeable tube 62 and the dust cover 63, thereby providing air circulation conditions for the storage space 102.

Exemplarily, the air permeable holder 61 is annular, the air permeable holder 61 is clamped and fixed to the separator plate 10. The air permeable holder 61 can be clamped and fixed to one or more single broads 30 corresponding to the suction column 20.

A bottom area of the air permeable holder 61 is larger than the area of the opening 22 of the suction column 20, so that the air permeable holder 61 can cover the opening 22 of the suction column 20 to prevent the planting medium from entering the cavity 21 of the corresponding suction column 20 and causing blockage.

Exemplarily, the air permeable tube 62 is made of PVC (polyvinyl chloride). A lower end of the air permeable tube 62 is inserted and fixed to the air permeable holder 61. The dust cover 63 is inserted and fixed to an upper end of the air permeable tube 62.

The embodiment of the present application further provides a planting device.

Figure 16:
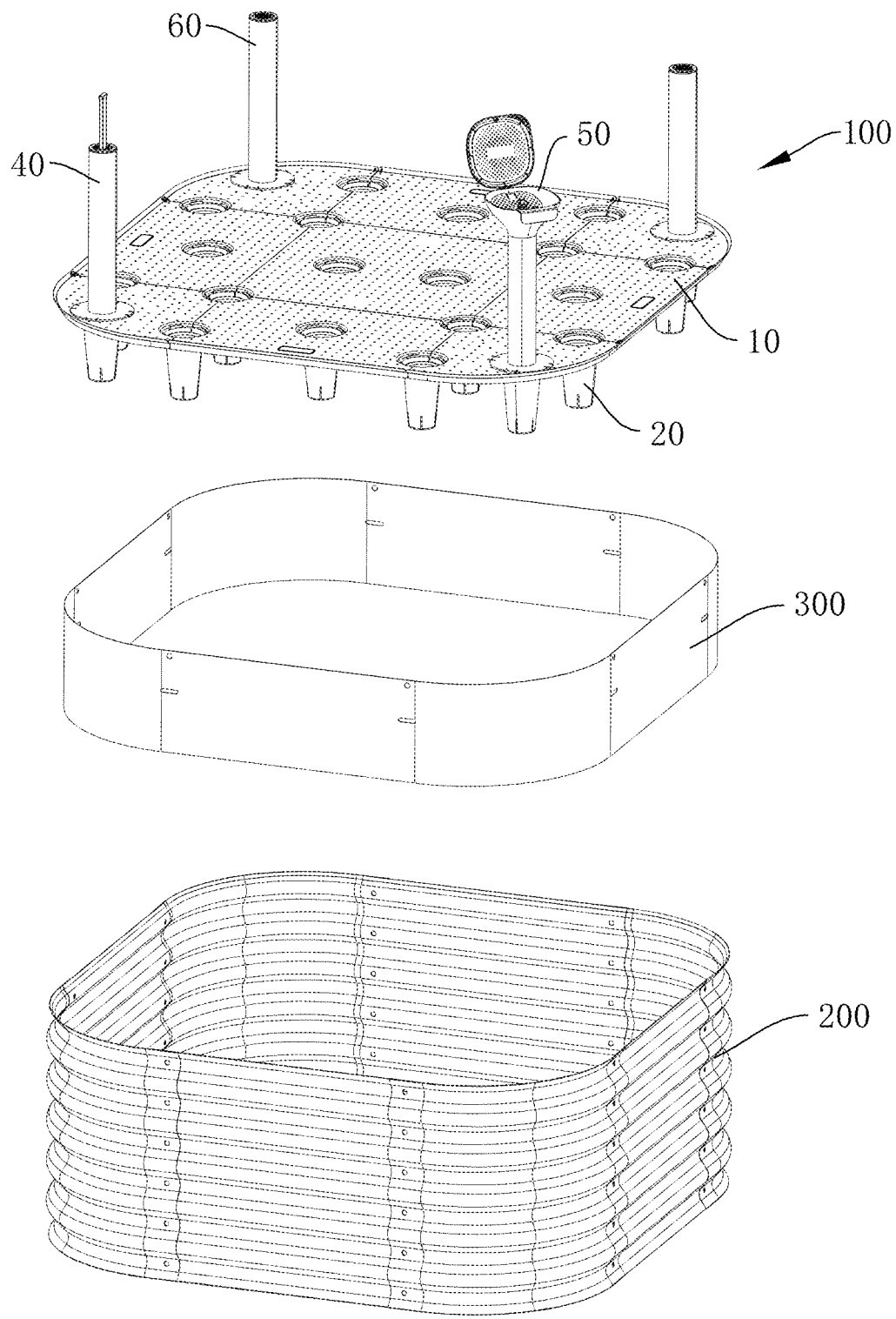
FIG. 16 is an explored diagram of the planting device according to an embodiment of the present application.

FIG. 16 is an explored diagram of the planting device according to an embodiment of the present application.

Referring to FIGS. 2, 3, and 16, the planting device 1000 includes the garden bed 200, the storage member 300, and the self-watering wicking structure 100. The storage member 300 and the self-watering wicking structure 100 are arranged in the garden bed 200. The storage member 300 is located at a bottom of the garden bed 200. An interior of the storage member 300, an inner wall of the garden bed 200, and a below of the self-watering wicking structure 100 form the storage space 102. An above of the self-watering wicking structure 100 and the inner wall of the garden bed 200 form the planting space 101.

Exemplarily, the garden bed 200 includes a plurality of fence panels, the plurality of fence panels are enclosed and spliced to form the garden bed 200. In other embodiments, the garden bed 200 can also be an integrated structure, and the size of the garden bed 200 can be configured according to actual needs, which is not limited in the present application.

Exemplarily, the storage member 300 may be a water bag. The storage member 300 is disposed at a bottom of the garden bed 200, the storage member 300 is bolted and fixed to an inner side of the garden bed 200. The storage member 300 is laid on the garden bed 200 as a whole and supported by the inner side of the garden bed 200. In other embodiments, the storage member 300 may also be a hard structure such as a basin, a box, etc., and a size of the storage member 300 may be configured according to actual needs, and the present application does not limit this.

In some embodiments, the self-watering wicking structure 100 includes the separator plate 10 and the plurality of suction columns 20. The separator plate 10 is disposed at the upper end of the suction column 20. The suction column 20 is placed in the storage member 300 and supports the separator plate 10 so that the separator plate 10 is located in the middle of the garden bed 200. Thus, the interior of the storage member 300, the inner wall of the garden bed 200 and the below of the separator plate 10 form the storage space 102. The above of the separator plate 10 and the inner wall of the garden bed 200 form the planting space 101.

The implementation principle and beneficial effects of the planting device 1000 provided in the embodiment of the present application can be specifically referred to the relevant descriptions in the aforementioned embodiments, and the present application will not elaborate on them here.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A self-watering wicking structure comprising:
a separator plate, provided with mounting positions, each of the mounting positions provided with a communication hole, a space above the separator plate forming a planting space, a space below the separator plate forming a storage space; and
suction columns arranged below the separator plate, the suction columns detachably connected to the mounting positions, each of the suction columns defining a cavity, an upper end of each of the suction columns defining an opening communicating with the cavity, the opening communicated with the communication hole, a lower end of each of the suction columns defining a passage hole communicating with the cavity;

wherein a planting medium in the planting space is capable of entering the cavity through the communicating hole, and a liquid in the storage space is capable of entering the cavity through the passage hole;

the separator plate comprises a plurality of single boards, the mounting positions comprise first mounting positions, the first mounting positions are arranged at edges of the single board, the communication hole is formed between the first mounting positions of adjacent plurality of single boards, the first mounting positions of adjacent plurality of single boards are detachably connected to the suction columns, so that the adjacent plurality of single boards are spliced and combined.

2. The self-watering wicking structure of claim 1, wherein the mounting positions further comprise second mounting positions, the second mounting positions are arranged in a middle portion of the signal board, a middle of each of the second mounting positions defines the communication hole.

3. The self-watering wicking structure of claim 1, wherein an upper end of the suction column is provided with a plurality of clasps, the mounting positions define a plurality of latch holes corresponding to the plurality of clasps, the plurality of clasps are detachably connected to the plurality of latch holes.

4. The self-watering wicking structure of claim 3, wherein an insertion portion is arranged at a bottom of each of the mounting positions, the insertion portion is arranged along a circumferential direction of the communication hole;

an upper end of the suction column is provided with an inner convex ring, the plurality of clasps are distributed around the inner convex ring, a spacing between the inner convex ring and the plurality of clasps is formed, the insertion portion is inserted and fixed between the inner convex ring and the plurality of clasps.

5. The self-watering wicking structure of claim 3, wherein each of the plurality of single boards is provided with ribs, the upper end of the suction column is provided with a plurality of positioning holes, the plurality of positioning holes and the plurality of clasps are arranged in a staggered way, the ribs of the adjacent plurality of single boards are correspondingly inserted into the positioning holes of the suction columns.

6. The self-watering wicking structure of claim 1, further comprising functional members, wherein the functional members are detachably connected to the separator plate, the functional members are connected to the cavity of a part of the suction columns.

7. The self-watering wicking structure of claim 6, wherein the functional members comprise a buoyage, the buoyage comprises:

a buoy holder detachably connected to the separator plate;

a buoy tube connected to the buoy holder and located above the suction column;

a buoy ball arranged in the cavity of the suction column, the buoy ball is made by blow molding, and a water level member, a lower end of the water level member is fixed to the buoy ball, an upper end of the water level member is exposed from the buoy tube.

8. The self-watering wicking structure of claim 6, wherein the functional members comprise a filling member, the filling member comprises:

a filling holder detachably connected to the separator plate;

a filling pipe connected to the filling holder, a lower end of the filling pipe is connected to the cavity of the suction column, and a filling head arranged at an upper end of the filling pipe.

9. The self-watering wicking structure of claim 6, wherein the functional members comprise an air permeable member, the air permeable member comprises:

an air permeable holder detachably connected to the separator plate;

an air permeable tube connected to the air permeable holder, a lower end of the air permeable tube is connected to the cavity of the suction column; and a dust cover arranged at an upper end of the air permeable tube, the dust cover is provided with a plurality of air permeable holes.

10. A planting device comprising:

a garden bed;

a storage member located at a bottom of the garden bed, and a self-watering wicking structure, the storage member and the self-watering wicking structure arranged in the garden bed, an interior of the storage member, an inner wall of the garden bed, and a below of the self-watering wicking structure forming a storage space, an above of the self-watering wicking structure and the inner wall of the garden bed forming a planting space; the self-watering wicking structure comprising:

a separator plate, provided with mounting positions, each of the mounting positions provided with a communication hole; and suction columns arranged below the separator plate, the suction columns detachably connected to the mounting positions, each of the suction columns defining a cavity, an upper end of each of the suction columns defining an opening communicating with the cavity, the opening communicated with the communication hole, a lower end of each of the suction columns defining a passage hole communicating with the cavity;

wherein a planting medium in the planting space is capable of entering the cavity through the communicating hole, and a liquid in the storage space is capable of entering the cavity through the passage hole;

the separator plate comprises a plurality of single boards, the mounting positions comprise first mounting positions, the first mounting positions are arranged at edges of the single board, the communication hole is formed between the first mounting positions of adjacent plurality of single boards, the first mounting positions of adjacent plurality of single boards are detachably connected to the suction columns, so that the adjacent plurality of single boards are spliced and combined.

11. The planting device structure of claim 10, wherein the mounting positions further comprise second mounting positions, the second mounting positions are arranged in a middle portion of the signal board, a middle of each of the second mounting positions defines the communication hole.

12. The planting device of claim 10, wherein an upper end of the suction column is provided with a plurality of clasps, the mounting positions define a plurality of latch holes corresponding to the plurality of clasps, the plurality of clasps are detachably connected to the plurality of latch holes.

13. The planting device of claim 12, wherein an insertion portion is arranged at a bottom of each of the mounting positions, the insertion portion is arranged along a circumferential direction of the communication hole;

an upper end of the suction column is provided with an inner convex ring, the plurality of clasps are distributed around the inner convex ring, a spacing between the inner convex ring and the plurality of clasps is formed, the insertion portion is inserted and fixed between the inner convex ring and the plurality of clasps.

14. The planting device of claim 12, wherein each of the plurality of single boards is provided with ribs, the upper end of the suction column is provided with a plurality of positioning holes, the plurality of positioning holes and the plurality of clasps are arranged in a staggered way, the ribs of the adjacent plurality of single boards are correspondingly inserted into the positioning holes of the suction columns.

15. The planting device of claim 10, wherein the self-watering wicking structure further comprises functional members, the functional members are detachably connected to the separator plate, the functional members are connected to the cavity of a part of the suction columns.

16. The planting device of claim 15, wherein the functional members comprise a buoyage, the buoyage comprises:

a buoy holder detachably connected to the separator plate;

a buoy tube connected to the buoy holder and located above the suction column;

a buoy ball arranged in the cavity of the suction column, the buoy ball is made by blow molding, and a water level member, a lower end of the water level member is fixed to the buoy ball, an upper end of the water level member is exposed from the buoy tube.

17. The planting device of claim 15, wherein the functional members comprise a filling member, the filling member comprises:

a filling holder detachably connected to the separator plate;

a filling pipe connected to the filling holder, a lower end of the filling pipe is connected to the cavity of the suction column, and a filling head arranged at an upper end of the filling pipe.

18. The planting device of claim 15, wherein the functional members comprise an air permeable member, the air permeable member comprises:

an air permeable holder detachably connected to the separator plate;

an air permeable tube connected to the air permeable holder, a lower end of the air permeable tube is connected to the cavity of the suction column; and a dust cover arranged at an upper end of the air permeable tube, the dust cover is provided with a plurality of air permeable holes.

\* \* \* \* \*